(12) United States Patent
Kothinti Naresh et al.

(10) Patent No.: US 11,755,330 B2
(45) Date of Patent: *Sep. 12, 2023

(54) TRACKING EXACT CONVERGENCE TO GUIDE THE RECOVERY PROCESS IN RESPONSE TO A MISPREDICTED BRANCH

(71) Applicant: Microsoft Technology Licensing, LLC, Redmond, WA (US)

(72) Inventors: Vignyan Reddy Kothinti Naresh, Redmond, WA (US); Shivam Priyadarshi, Apex, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,341

(22) Filed: Sep. 13, 2022

(65) Prior Publication Data
US 2023/0004397 A1 Jan. 5, 2023

Related U.S. Application Data

(63) Continuation of application No. 17/323,069, filed on May 18, 2021, now Pat. No. 11,494,191.

(51) Int. Cl.
*G06F 9/38* (2018.01)
(52) U.S. Cl.
CPC .......... *G06F 9/3861* (2013.01); *G06F 9/3867* (2013.01)

(58) Field of Classification Search
None
See application file for complete search history.

(56) References Cited

U.S. PATENT DOCUMENTS 11,494,191 B1 * 11/2022 Kothinti Naresh ... G06F 9/3867

* cited by examiner

*Primary Examiner* — Keith E Vicary
(74) *Attorney, Agent, or Firm* — Ranjeev Singh; Singh Law, PLLC

(57) ABSTRACT

Processors and methods related to tracking exact convergence to guide the recovery process in response to a mispredicted branch are provided. An example processor includes a pipeline having a frontend and a backend. The processor further includes a state table for maintaining information related to at least a subset of branches corresponding to instructions being processed by the processor. The processor further includes state logic configured to access the state table and track locations of any exact convergence points associated with branches corresponding to the instructions being processed by the processor. The state logic is further configured to identify a first recovery method for recovering from a misprediction associated with a branch if a location of an exact convergence point associated with the branch is determined to be in the frontend of the pipeline, else identify a second recovery method for recovering from the misprediction associated with the branch.

20 Claims, 7 Drawing Sheets

| BR AGE 310 | EC AGE 320 | ECPC 330 | INFO 340 | OPT 350 | VAL 360 |
|---|---|---|---|---|---|
| | | | | | |

TRACKING EXACT CONVERGENCE TO GUIDE THE RECOVERY PROCESS IN RESPONSE TO A MISPREDICTED BRANCH

CROSS-REFERENCE TO RELATED APPLICATION(S)

This application is a continuation of U.S. patent application Ser. No. 17/323,069, filed on May 18, 2021, entitled "TRACKING EXACT CONVERGENCE TO GUIDE THE RECOVERY PROCESS IN RESPONSE TO A MISPREDICTED BRANCH," the entire contents of which are hereby incorporated herein by reference.

BACKGROUND

A multi-threaded processor may fetch the instructions belonging to a thread and execute them. While executing instructions for a thread, the processor may execute an instruction that refers to a register or a memory location. Because of the delay associated with the access to the referenced memory location, the processor may have to wait until the referenced memory location is accessed. Similarly, if an instruction takes multiple cycles to execute, a subsequent instruction that depends on it will have to wait. In order to maintain efficiency, the processor may fetch instructions from a different thread and start executing them. This way, the processor may execute instructions more efficiently. This type of parallelism may be referred to as thread level parallelism. Another way to improve the processors performance is the use of instruction level parallelism.

Instruction level parallelism may include determining the dependences of the instructions in a thread and issuing the instructions that are independent. The processor may speculatively try to predict dependences and execute the instructions in the thread based on that. Such predictions may turn out to be inaccurate and the processor may have to recover from the mispredicted branch, including having to discard the results of the incorrectly predicted dependences of the instructions, and re-execute the instructions in the correct order. The recovery from the mispredicted branch may be suboptimal.

SUMMARY

In one example, the present disclosure relates to a processor including a pipeline comprising a first plurality of stages corresponding to a frontend of the pipeline and a second plurality of stages corresponding to a backend of the pipeline. The processor may further include a state table for maintaining information related to at least a subset of branches corresponding to instructions being processed by the processor. The processor may further include state logic configured to access the state table. The state logic may further be configured to track locations of any exact convergence points associated with at least a subset of branches corresponding to the instructions being processed by the processor. The state logic may further be configured to identify a first recovery method for recovering from a misprediction associated with a branch from at least the subset of branches if a location of an exact convergence point associated with the branch from at least the subset of branches is determined to be in the frontend of the pipeline, else identify a second recovery method, different from the first recovery method, for recovering from the misprediction associated with the branch.

In another example, the present disclosure relates to a method for operating a processor including a pipeline comprising a first plurality of stages corresponding to a frontend of the pipeline and a second plurality of stages corresponding to a backend of the pipeline. The method may include tracking locations of any exact convergence points associated with at least a subset of branches corresponding to instructions being processed using the processor. The method may further include identifying a first recovery method for recovering from a misprediction associated with a branch from at least the subset of branches if a location of an exact convergence point associated with the branch is determined to be in the frontend of the pipeline, else identifying a second recovery method, different from the first recovery method, for recovering from the misprediction associated with the branch.

In yet another example, the present disclosure relates to a method for operating a processor including a pipeline comprising a first plurality of stages corresponding to a frontend of the pipeline and a second plurality of stages corresponding to a backend of the pipeline. The method may include tracking locations of any exact convergence points associated with at least a subset of branches corresponding to instructions being processed using the processor. The method may further include maintaining a state table comprising information associated with at least the subset of branches corresponding to the instructions being processed using the processor. The method may further include based on the tracking and the information in the state table, identifying a first recovery method for recovering from a misprediction associated with a branch from at least the subset of branches if a location of an exact convergence point associated with the branch is determined to be in the frontend of the pipeline, else identifying a second recovery method, different from the first recovery method, for recovering from the misprediction associated with the branch.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 3 shows an example state table for use with the immunity table logic of FIG. 2 in accordance with one example;

DETAILED DESCRIPTION

Figure 1:
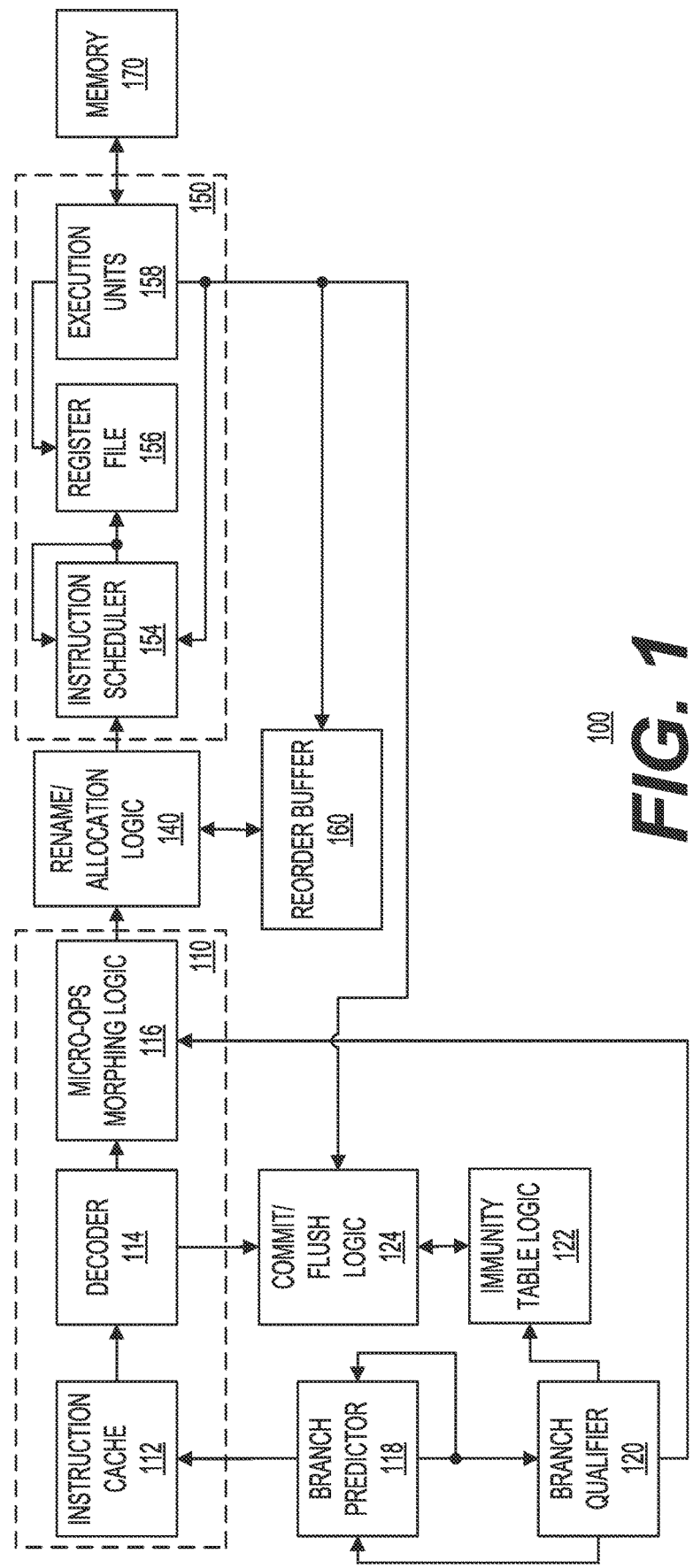
FIG. 1 is a diagram of a processor including the tracking of exact convergence branches to guide the recovery process from a misprediction by a branch predictor in accordance with one example.

Examples described in this disclosure relate to tracking exact convergence to guide the recovery process in response to a mispredicted branch. Exact convergence may occur when the mispredicted path converges at the very beginning of the correct path. As noted earlier, instruction level parallelism in a processor may include determining the dependences of the instructions in a thread and issuing the instructions that are independent. The processor may speculatively try to predict dependences and execute the instructions in the thread based on that. Such predictions may turn out to be inaccurate resulting in the processor having to discard the results of the incorrectly predicted dependences of the instructions and re-execute the instructions in the correct order. Branch mispredictions are very expensive in terms of the performance penalty. One way to lower the misprediction penalty is to use control independence.

Control independence refers to the region of code that executes regardless of a branch's direction (e.g., the region of code that is independent of the control decision associated with the branch). The region of the code that is executed based on the branch's control outcome is referred to as the control dependent (CD) region. Control independent (CI) instructions can be further classified based on their data dependence on the control dependent region. If a control independent (CI) instruction is dependent on data modified by the control dependent (CD) region, then it may be referred to as a control independent data dependent (CIDD) instruction, otherwise, it may be referred to as a control independent data independent (CIDI) instruction.

If a qualified branch is predicted by the branch predictor as Taken, then the alternate target is the fall-through address (address of the next instruction if the branch were Not-Taken). If the qualified branch is predicted by the branch predictor as Not-Taken, then the alternate target is the branch target address (address of the next instruction if the branch were to be Taken). A qualified branch establishes apparatus to search for the alternate target in the instruction stream. There can be any number and types of dynamic instructions before the alternate target is found in the instruction stream. For example, this could be a simple single-sided hammock or a double-sided hammock where a future iteration of the branch was predicted in a different way. A single-sided hammock may correspond to an "if-then" idiom and a double-sided hammock may correspond to an "if-then-else" idiom. Alternatively, the branch may be a non-hammock type structure that just happened to get the alternate target in the fetch stream. The alternate target, however, may still need to be found before the qualified branch resolves in order to optimize the recovery process of a qualified branch if it mispredicts.

In the present disclosure, as part of the misprediction resolution, a processor may use any of three types of recovery methods: (1) Conventional Flush Recovery, (2) Full-Pipeline Selective Recovery, or (3) Frontend Selective Recovery. As part of the Conventional Flush Recovery, all of the instructions younger than the mispredicted branch may be flushed from the pipeline of the processor, and the instruction fetch logic may be redirected to fetch the instructions corresponding to the correct path. One example of Full-Pipeline Selective Recovery is the selective branch recovery (SBR). As part of the SBR, the incorrect control dependent (CD) path may be replayed as predicate-fail instructions (with the destination registers getting their previously mapped values) to repair the dependence chain. Additionally, all the control independent data dependent (CIDD) instructions may be replayed by reinserting them into the instruction scheduler. One example of the Frontend Selective Recovery is selective pipeline flush (SPF). In one example, the SPF is similar to the SBR, but the exact convergence point is limited to the frontend of the pipeline of the processor to simplify the recovery hardware by using conventional flush recovery to clear out the backend and to repair the pipeline.

In the present disclosure, techniques and structures are described that identify when the Full-Pipeline Selective Recovery is likely to hurt the processors performance and both track and guide the recovery process. It is observed that the Full-Pipeline Selective Recovery hurts the processor's performance when no control independent (CI) instructions are fetched into the backend of the pipeline of the processor. Tracking the exact convergence point to be either in the frontend of the pipeline or the backend of the pipeline of the processor can indicate if the Full-Pipeline Selective Recovery is likely to hurt performance. Performance can also be hurt because the control dependent (CD) instructions themselves have not very likely executed yet and are unlikely to be immediately ready for execution. This can also delay the execution of a critical program path leading to performance loss. If the exact convergence point is found in the frontend of the pipeline, indicating that there are no control independent (CI) instructions in the backend of the pipeline, then the Frontend Selective Recovery is used to recover from a pipeline flush. In this manner, instead of in the Conventional Flush Recovery, the correct path instructions are supplied quicker, just like the Full-Pipeline Selective Recovery. In this scenario, however, unlike the Full-Pipeline Selective Recovery, the Frontend Selective Recovery discards the overhead of the control dependent (CD) instructions as they are not useful.

FIG. 1 is a diagram of a processor 100 including the tracking of exact convergence branches to guide the recovery process from a misprediction by a branch predictor in accordance with one example. Functional blocks corresponding to processor 100 may be implemented as part of an integrated circuit. Processor 100 may include a pipeline for processing instructions, including a frontend 110 and a backend 150. As used herein the term "frontend" includes, but is not limited to, one or more stages of the instruction processing pipeline of a processor that are arranged towards the fetch side of the instruction processing pipeline of the processor. In this example, frontend 110 of the pipeline for processor 100 may include an instruction cache 112, a decoder 114, and micro-ops morphing logic 116. As another example, any pipeline stages before rename/allocation logic 140 may be considered as part of frontend 110. As used herein the term "backend" includes, but is not limited to, one or more stages of the instruction processing pipeline of the processor that are arranged towards the execution units side of the instruction processing pipeline of the processor. In this example, backend 150 of the pipeline for processor 100 may include an instruction scheduler 154, a register file 156, and execution units 158. As another example, any pipeline stages after rename/allocation logic 140 may be considered as part of backend 150. Processor 100 may further include a memory 170, which may include one or more levels of caches. Processor 100 may further include a branch predictor 118, a branch qualifier 120, immunity table logic 122, commit/flush logic 124, and a reorder buffer 160.

With continued reference to FIG. 1, in this example, as part of the processing of the instructions in frontend 110, instructions stored in instruction cache 112 may be decoded using decoder 114. In one example, instructions predicted by branch predictor 118 may also be decoded by decoder 114. After decoding, micro-ops morphing logic 116 may convert the decoded instructions when needed into micro-ops based on the specific architecture associated with processor 100. In addition, micro-ops morphing logic 116 may modify the instructions to add any needed tracking information that may be required to facilitate the replaying of the instructions.

Branch predictor 118 may be used to address some of the limitations of the instruction level parallelism. As an example, branch predictor 118 may speculatively predict the direction of a branch (e.g., an if-then-else type of branch). In this example, exact convergence tracking is accomplished by branch qualifier 120 and immunity table logic 122. Exact convergence may occur when the mispredicted path converges at the very beginning of the correct path. As a result of the exact convergence, there may be no control dependent (CD) instructions that may be required to be re-inserted into the instruction pipeline. Branch qualifier 120 may determine if a branch is eligible for optimization based on the branch's static or dynamic characteristics, branch prediction confidence, or a compound metric. If branch qualifier 120 determines that the branch is eligible for optimization, then it may be considered a qualified branch. An entry for the qualified branch may be established in a state table (described in more detail later) associated with immunity table logic 122. In this way the exact convergence point of the qualified branch may be tracked and other related characteristics of the qualified branch may be recorded. In this example, once the exact convergence of a qualified branch is detected, the corresponding entry for the branch in the state table may be updated to reflect the optimized nature of the qualified branch. The update from the qualified branch to the optimized branch is based on the location of the exact convergence point of the branch instruction within the pipeline of the processor. Thus, if the exact convergence point of the branch instruction is located in frontend 110, then the qualified branch is updated as an optimized branch. The optimized branch may then be subject to a first type of recovery method unless the optimized branch is upgraded. As an example the upgrade may be based on the location of the exact convergence point moving into backend 150. Other metrics may also be used to determine when to upgrade the optimized branch. As an example, the upgrade may be based on the tracking of the execution of the instructions in the exact convergence path. As another example, the upgrade may be based on when the instruction execution passes a certain stage (e.g., rename/allocation logic 140 of FIG. 1) in the pipeline associated with the processor. Any of the aforementioned metrics may be used alone or combined in any manner to determine when to upgrade the optimized branch. The upgrade may result in the upgraded branch being subject to a second type of recovery method, different from the first type of recovery method.

Still referring to FIG. 1, as part of the processing of the instructions in backend 150 of the pipeline, rename/allocation logic 140 may annotate the instructions with bit-vectors (e.g., ready bit-vectors) to indicate the control dependent (CD) or the control independent data dependent (CIDD) nature of an instruction in any of the in-flight qualified branches. Instruction scheduler 154 may schedule instructions for further processing using execution units 158. Operands or other data may be accessed by execution units 158 from register file 156. The results of the processing by execution units 158 may be stored in register file 156 or memory 170. The replay logic, included as part of instruction scheduler 154, may track the start point and the end point of the control dependent (CD) region for each qualified branch. The replay logic may be configured to manage the captured instructions based on at least three possible scenarios. The first scenario may include multiple qualified exact convergence branches in flight that resolve in out-of-order fashion. The second scenario may include a qualified mispredicted exact convergence branch that is not optimized. The third scenario may include a situation in which a qualified exact convergence branch did not mispredict. The instruction replay logic may track and store all the control dependent (CD) and control independent data dependent (CIDD) instructions of the qualified branches as they are allocated into the instruction scheduler. In this example, when a branch resolves, the outcome may be communicated to the replay logic and commit/flush logic 124. If the branch mispredicts, the commit/flush logic 124 may consult the state table (described in more detail later) to determine if the mispredicted branch is optimized to initiate the appropriate exact convergence recovery.

With continued reference to FIG. 1, immunity table logic 122 could also recommend different recovery flavors depending on the dynamic control path characteristics of the pipeline. In this example, commit/flush logic 124 may communicate the recovery method and the related information to the replay logic (e.g., included as part of instruction scheduler 154) to initiate the exact convergence branch replay if needed. The allocated entries for the qualified branch in the replay logic and the immunity table may be reclaimed if the resolving branch is the oldest qualified branch. Table 1 below shows the three recovery methods that could be used to recover from the branch misprediction.

TABLE 1

|  | Frontend | Backend | Instruction Fetch |
| --- | --- | --- | --- |
| Conventional Flush Recovery | Flush | Flush | Redirect |
| Frontend Selective Recovery | Range Flush | Flush | No Redirect |
| Full-Pipeline Selective Recovery | No Flush; Dynamic Predicate-Fail of the Control Dependent (CD) Instructions in the Frontend | Range Flush; Replay Control Dependent (CD) Instructions, Control Independent Data Dependent | No Redirect |

TABLE 1-continued

| Frontend | Backend | Instruction Fetch |
|---|---|---|
| | (CIDD) Instructions, and Any Unissued Control Independent (CI) Instructions | |

In one example, as part of the Conventional Flush Recovery, all the instructions younger than the mispredicted branch may be flushed from the pipeline of the processor, and the instruction fetch logic (not shown) may be redirected to fetch the instructions corresponding to the correct path. One example of the Full-Pipeline Selective Recovery is the Selective Branch Recovery (SBR). As part of the SBR, the incorrect control dependent (CD) path may be replayed as predicate-fail instructions (with the destination registers getting their previously mapped values) to repair the dependence chain. Additionally, all the control independent data dependent (CIDD) instructions may be replayed by reinserting them into the instruction scheduler. One example of the Frontend Selective Recovery is Selective Pipeline Flush (SPF). In one example, the SPF is similar to the SBR, but the exact convergence point is limited to the frontend of the processor (e.g., frontend 120). This may simplify the recovery hardware by using conventional flush recovery to clear out the backend and to repair the pipeline. Although FIG. 1 shows a certain number of components of processor 100 arranged in a certain manner, there could be more or fewer number of components arranged differently.

Figure 2:
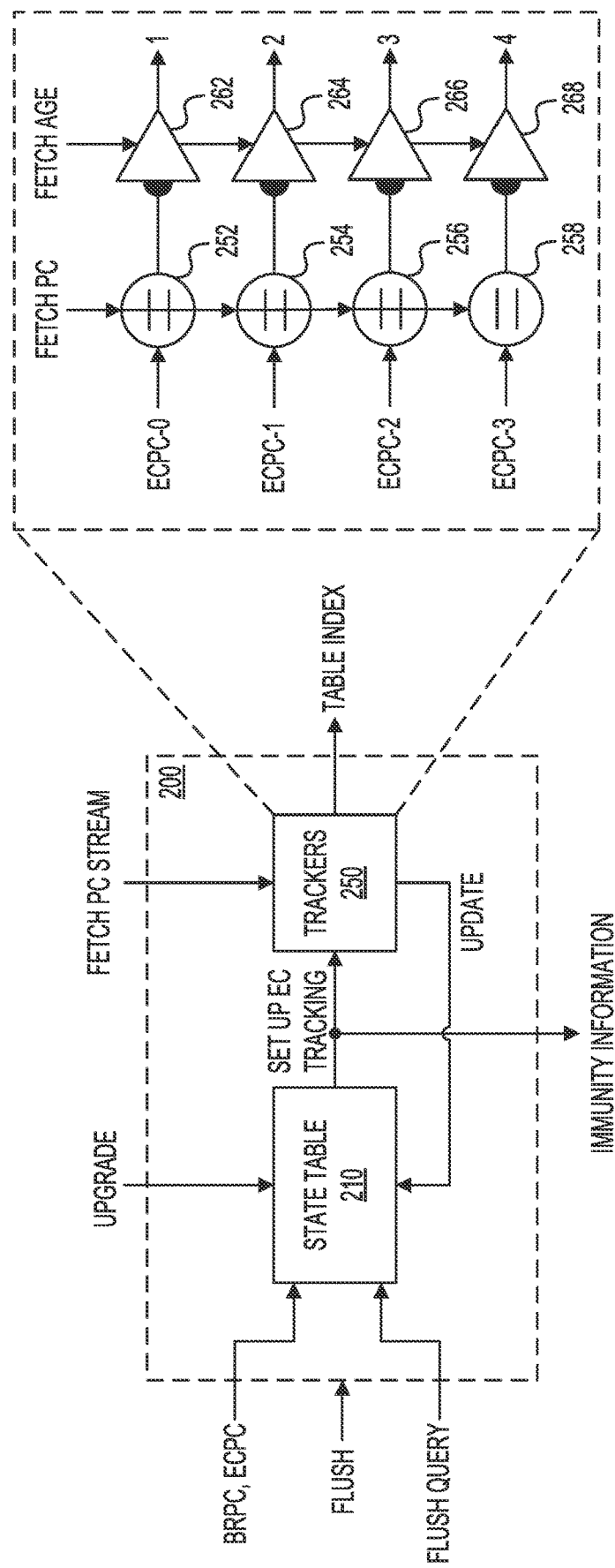
FIG. 2 is a block diagram of immunity table logic associated with the processor of FIG. 1 in accordance with one example.

FIG. 2 is a block diagram of immunity table logic 200 associated with processor 100 of FIG. 1 in accordance with one example. In this example, immunity table logic 200 may be used to implement immunity table logic 122 of FIG. 1. Since the exact convergence of a branch is opportunistic and depends on the future stream of instructions, in this example, a hardware structure is needed to track the state of qualified branches. A qualified branch may not be optimized due to a variety of reasons based on the exact convergence optimization (e.g., the alternate target of a qualified branch is not fetched before the branch resolves). Immunity table logic 200, which corresponds to immunity table logic 122 of FIG. 1, may be used to track the qualified branches.

Immunity table logic 200 may include a STATE TABLE 210 and TRACKERS 250. A qualified branch may be allocated an entry in STATE TABLE 210 if there is no contention. State table 210 may receive each branches' program counter (BRPC) and if available the exact convergence program counter (ECPC) from branch qualifier 120 of FIG. 1. Immunity table logic 200 may receive a flush signal (FLUSH) from commit/flush logic 124 of FIG. 1. State table 210 may receive a flush query (FLUSH QUERY) from commit/flush logic 124 of FIG. 1. State table 210 may further receive an upgrade signal (UPGRADE), which is described in more detail later. State table 210 may setup a trackers (SET UP EC TRACKING). TRACKERS 250 may further provide an update signal (UPDATE) to STATE TABLE 210 and also may provide the TABLE INDEX corresponding to the table entry. In one example, a tracker may be associated with a respective entry in STATE TABLE 210. Efficiency may be improved by sharing trackers between multiple entries of STATE TABLE 210, as trackers are only needed until the exact convergence point is detected.

With continued reference to FIG. 2, immunity table logic 200 may track all qualified branches for their exact convergence occurrence and the characteristics of the exact convergence. All qualified branches may get an entry in STATE TABLE 210, and capture the expected instruction address for exact convergence. One example implementation can be allocating the entries in STATE TABLE 210 in a FIFO order, where the oldest entry is overwritten. An elaborate approach may be to use the dynamic branch characteristics to affect the replacement policy of the state table entries. If all the entries are occupied by qualified branches, the new qualified branch could simply be disqualified instead of forcing an eviction of the existing older branches.

Still referring to FIG. 2, TRACKERS 250 may be fed a stream of fetched instruction addresses (FETCH PC STREAM) to detect the exact convergence point of the corresponding branch assuming the branch ultimately ends having an exact convergence point. Immunity table logic 200 is implemented to mark the branch optimized as long as there is one dynamic instance of the alternate target in the fetch stages of the pipeline (e.g., frontend 110 of FIG. 1). In one example, this requires continuous tracking of a qualified branch till resolution as the corresponding optimized state can toggle multiple times depending on the location and occurrence of the alternate target. When a qualified branch resolves, frontend flush and fetch redirection are avoided only if the alternate target is found in the frontend of the pipeline, as indicated by a corresponding entry in STATE TABLE 210. A variation of this could be to track the instruction program counters at different pipeline stages—for example, the decode or the rename/allocation stages. Once the exact convergence of a branch is found, the corresponding branch entry in STATE TABLE 210 may be marked as optimized.

FIG. 3 shows an example STATE TABLE 300 for use with immunity table logic 200. STATE TABLE 300 (corresponding to STATE TABLE 210) may include several columns, including BR AGE 310, EC AGE 320, ECPC 330, INFO 340, OPT 350, and VAL 360. BR AGE 310 column may be used to capture the age of the branch. The age of the branch may be captured by incrementing the age of the branch every time an instruction is fetched by processor 100 for processing as part of the pipeline. The branch age may be managed using wraparound structures to optimize the number of bits needed to keep track of the branch age. EC AGE 320 column may correspond to the exact convergence point age. The branch age (e.g., stored in BR AGE 310 column) and the exact convergence age (e.g., stored in EC AGE 320 column) may be used to maintain the live entries of the STATE TABLE 300 in case of pipeline flushes. The branch age may also be used during lookup to verify that the entry corresponds to the mispredicted branch. When a branch comes in, immunity table logic 200 checks the branch's age and the exact convergence program counter (ECPC), which represents the alternate target for the branch instruction. If the branch is predicted as not taken, then immunity table logic 200 sets up a tracker (e.g., as part of TRACKERS 250) to track the exact convergence point for the associated qualified branch and update the corresponding state table entry when the exact convergence is found. Only the oldest resolved qualified branches may release their entries to enable nested exact convergence recovery. TRACKERS 250 may compare the program counters being received via the FETCH PC STREAM with the exact convergence program counter (ECPC). If there is a match between the exact convergence program counter (ECPC) and a program counter received via the FETCH PC STREAM, immunity table logic 200 may update (UPDATE) the corresponding STATE TABLE 210 entry to indicate that the branch is now a qualified branch. When a qualified branch mispredicts, the immunity table index and its age (e.g., BR AGE 310) are sent to the commit/flush logic 124 of FIG. 1. Commit/flush logic 124 may use the index and the branch age to consult STATE TABLE 210 for guidance. Immunity table logic 200 may then access the corresponding entry and match the branch age to determine if the entry belongs to the mispredicted branch. If the entry does belong to the mispredicted branch, then immunity table logic 200 determines whether the branch is optimized. And if the branch is optimized, immunity table logic 200 determines the level of optimization to use (e.g., the Full-Pipeline Selective Recovery or the Frontend Selective Recovery). If immunity table logic 200 indicates that the mispredicted branch was not found in the STATE TABLE 210 or that it was not optimized, then commit/flush logic 124 may raise a full-pipeline flush recovery.

One implementation of trackers 250 may include the arrangement of comparators and multiplexers shown in FIG. 2 to detect the matches between the exact convergence program counters (ECPCs) and the program counters (labeled as FETCH PC) being received via the FETCH PC STREAM. Comparator 252 may compare ECPC-0 with the program counters, comparator 254 may compare ECPC-1 with the program counters, comparator 256 may compare ECPC-2 with the program counters, and comparator 258 may compare ECPC-3 with the program counters. Each of the comparators may be coupled to multiplexers (e.g., multiplexers 262, 264, 266, and 268), as shown in FIG. 2. Depending on the comparison's result, each of the multiplexers may provide outputs 1, 2, 3, and 4. Table 2 below shows example outputs 1, 2, 3, and 4 depending on whether there is a match or not. Thus, assuming the comparison performed by comparator 252 results in a match, then multiplexer 262 may output signal 1 that results in the state table 210 entries updated as: Optimize Entry #0, Update EC AGE. Output signals 2 and 3 indicate no match, and thus no entries of state table 210 may be updated. On the other hand, assuming the comparison performed by comparator 258 results in another match, then multiplexer 268 may output signal 4 that results in the state table 210 entries updated as: Optimize Entry #0, Update EC AGE, Release Entry. Thus, as part of this match, not only the state table entries may be updated but the entry may be released for future use.

TABLE 2

| Output | Description |
| --- | --- |
| 1 | Match! Optimize Entry #0, Update EC AGE |
| 2 | No Match! |
| 3 | No Match! |
| 4 | Match! Optimize Entry #0, Update EC AGE, Release Entry |

With continued reference to FIG. 2, once the exact convergence point is found, TRACKERS 250 may update OPT 350 column to indicate the optimized nature of the branch. Entries stored as part of VAL 360 column may indicate that the table entry is occupied by a qualified branch, and when the exact convergence point is found by TRACKERS 250 in the FETCH PC STREAM, TRACKERS 250 may update the corresponding entry in VAL 360 column. When the qualified branch is optimized, the appropriate entry in OPT 350 column may be set, and the exact convergence age may be captured in EC AGE 320 column. INFO 340 column may be used to store information, such as the exact convergence path length, and other branch characteristics, including the branch criticality and the prediction confidence.

In addition, if a branch mispredicts, then the immunity table index and its age (e.g., BR AGE 310) are sent to the commit/flush logic 124 of FIG. 1. Commit/flush logic 124 may issue a FLUSH QUERY to look up STATE TABLE 210 (STATE TABLE 300 shows the details of an example STATE TABLE 210). Using the FLUSH QUERY, commit/flush logic 124 may use the index and the branch age to consult STATE TABLE 210 for guidance. Immunity table logic 200 may then access the corresponding entry and match the branch age to determine if the entry belongs to the mispredicted branch. If the entry does belong to the mispredicted branch, then immunity table logic 200 determines whether the branch is optimized. And if the branch is optimized, immunity table logic 200 may determine the level of optimization to use (e.g., the Full-pipeline Selective Recovery or the Frontend Selective Recovery). In addition, in response to the FLUSH QUERY, immunity table logic 200 may provide IMMUNITY INFORMATION stored as part of STATE TABLE 210, including the information stored as part of INFO 340 column. The type of recovery that is performed may be based on the UPGRADE signal provided to STATE TABLE 210. The UPGRADE signal may act as a proxy for a pipeline location of the exact convergence instruction. If immunity table logic 200 indicates that the mispredicted branch was not found in the STATE TABLE 210 or that it was not optimized, then commit/flush logic 124 may raise a full-pipeline flush recovery.

On a pipeline flush, a pipeline flush request is raised to the commit/flush logic 124 of FIG. 1, which may prioritize flushes from multiple sources to conduct appropriate pipeline recovery. In addition, on a pipeline flush, all entries in STATE TABLE 210 with qualified branches younger (based on EC AGE 320) than the flush may be freed. If there are older qualified branches with the exact convergence age (e.g., stored as part of EC AGE 320 column) younger than the flush, their corresponding optimized entries (OPT 350 column) may also be cleared, and the freed entries may be set up to track the instruction fetch stream to be optimized again. In addition, new trackers may be set up. Like an unqualified branch, a qualified branch will raise a pipeline flush request upon its misprediction resolution. In addition, the qualified branch will also send a valid assigned TABLE INDEX upon its misprediction resolution. Although FIG. 2 shows a certain number of components of immunity table logic 200 arranged in a certain manner, there could be more or fewer number of components arranged differently. As an example, although FIG. 2 shows separate STATE TABLE 210 and TRACKERS 250, they could be combined to realize similar functionality as described earlier. As another example, although FIG. 2 shows a certain number and a certain arrangement of comparators and multiplexers as part of TRACKERS 250, additional or fewer comparators and multiplexers, arranged differently, may also be used. In addition, although FIG. 3 shows STATE TABLE 300 as including certain columns, STATE TABLE 300 may include additional or fewer columns.

Figure 4:
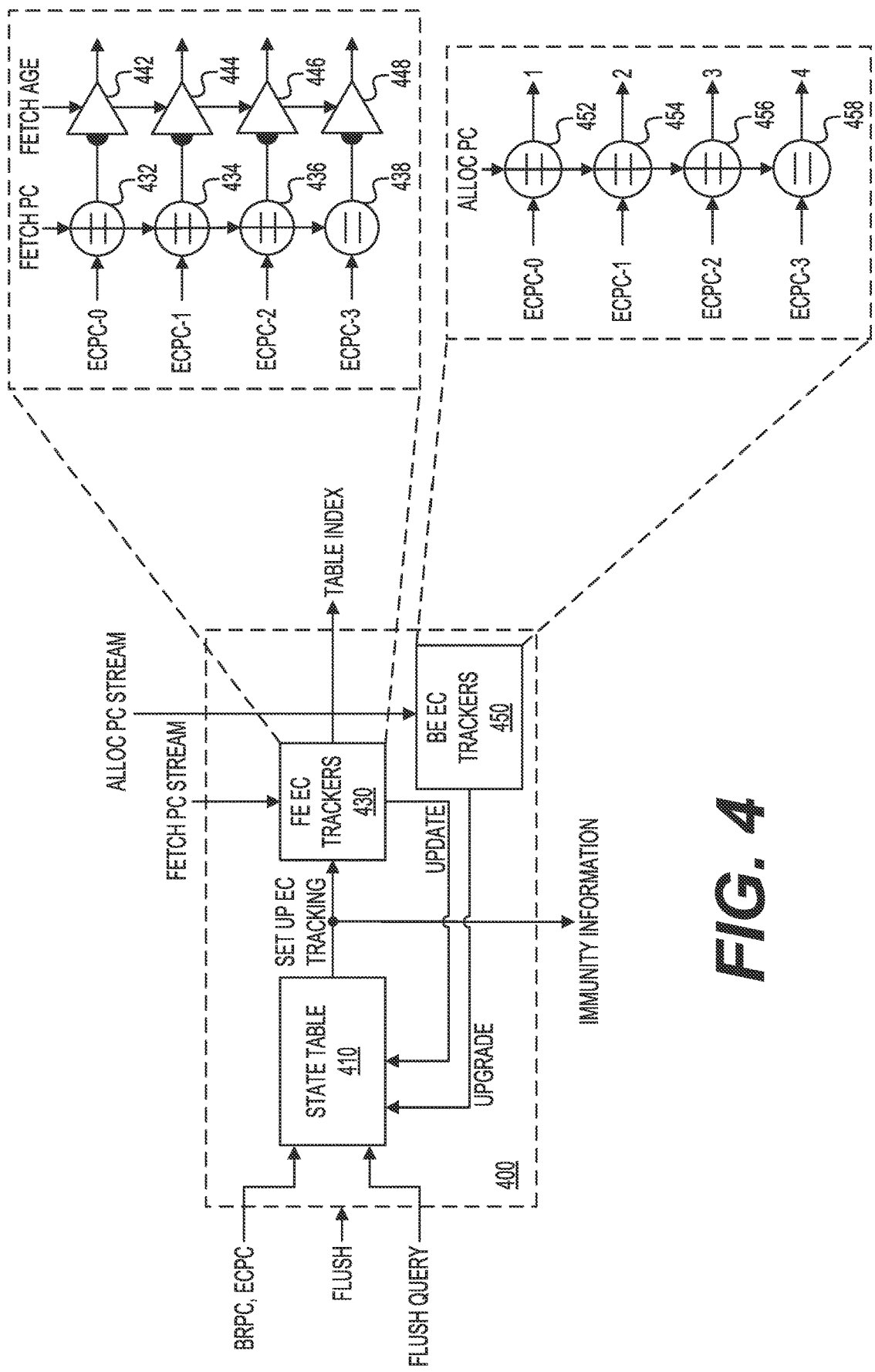
FIG. 4 is a block diagram of immunity table logic associated with processor 100 of FIG. 1 in accordance with one example.

FIG. 4 is a block diagram of immunity table logic 400 associated with processor 100 of FIG. 1 in accordance with one example. Immunity table logic 400 has similar components as described earlier with respect to immunity table logic 200. Immunity table logic 400, however, is modified to allow for the generation of the upgrade (UPGRADE) signal. The type of recovery that is performed may be based on the upgrade (UPGRADE) signal provided to STATE TABLE 410. The upgrade (UPGRADE) signal may act as a proxy for a pipeline location of the exact convergence instruction. As part of immunity table logic 400, two separate sets of trackers are set up for the frontend and the backend instructions. A tracker associated with the frontend exact convergence trackers (FE EC TRACKERS 430) may detect the exact convergence of a branch in a similar manner as explained earlier with respect to TRACKERS 250 of FIG. 2. Apart from setting a value of an entry in OPT 350 column, the tracker associated with FE EC TRACKERS 430 may also transmit a signal to one of the trackers associated with the backend exact convergence trackers (BE EC TRACKERS 450) to start detecting when the exact convergence instruction enters the backend pipeline of the processor (e.g., backend 150). As the exact convergence instruction enters the backend, the corresponding branch entry in STATE TABLE 410 is upgraded, via the UPGRADE signal output by the tracker associated with BE EC TRACKERS 450, to indicate that the optimized mispredicted branch now qualifies for the Full-Pipeline Selective Recovery, and not just the Frontend Selective Recovery. BE EC TRACKERS 450 may compare the program counters being received via the ALLOC PC STREAM with the exact convergence program counter (ECPC). If there is a match between the exact convergence program counter (ECPC) and a program counter received via the ALLOC PC STREAM, immunity table logic 400 may update (UPDATE) the corresponding STATE TABLE 410 entry. In addition, immunity table logic 400 may send a valid assigned table index (TABLE INDEX) to commit/flush logic 124 of FIG. 1 in a similar manner as described earlier with respect to immunity table logic 200.

One implementation of FE EC TRACKERS 430 may include a similar arrangement of comparators and multiplexers as shown in FIG. 2 to detect the matches between the exact convergence program counters (ECPCs) and the program counters (labeled as FETCH PC) being received via the FETCH PC STREAM. Comparator 432 may compare ECPC-0 with the program counters, comparator 434 may compare ECPC-1 with the program counters, comparator 436 may compare ECPC-2 with the program counters, and comparator 438 may compare ECPC-3 with the program counters. Each of the comparators may be coupled to multiplexers (e.g., multiplexers 442, 444, 446, and 448). Depending on the comparison's result, each of the multiplexers may provide outputs 1, 2, 3, and 4. Table 3 below shows example outputs 1, 2, 3, and 4 depending on whether there is a match or not. Thus, assuming the comparison performed by comparator 432 results in a match, then multiplexer 442 may output signal 1 that results in the state table 410 entries updated as: Optimize Entry #0, Update EC AGE. Output signals 2 and 3 indicate no match, and thus no entries of state table 410 may be updated. On the other hand, assuming the comparison performed by comparator 438 results in another match, then multiplexer 448 may output signal 4 that results in the state table 410 entries updated as: Optimize Entry #0, Update EC AGE, Release Entry. Thus, as part of this match, not only the state table entries may be updated but the entry may be released for future use.

TABLE 3

| Output | Description |
| --- | --- |
| 1 | Match! Optimize Entry #0, Update EC AGE |
| 2 | No Match! |
| 3 | No Match! |
| 4 | Match! Optimize Entry #0, Update EC AGE, Release Entry |

Still referring to FIG. 4, one implementation of BE EC TRACKERS 450 may include an arrangement of comparators to detect the matches between the exact convergence program counters (ECPCs) and the program counters (labeled as ALLOC PC) being received via the ALLOC PC STREAM. Comparator 452 may compare ECPC-0 with the program counters, comparator 454 may compare ECPC-1 with the program counters, comparator 456 may compare ECPC-2 with the program counters, and comparator 458 may compare ECPC-3 with the program counters. If there is a match, then the corresponding output signal (1, 2, 3, or 4) may be the upgrade (UPGRADE) signal to state table 410.

With continued reference to FIG. 4, commit/flush logic 124 of FIG. 1 may receive the pipeline flush request. In this example, based on the IMMUNITY INFORMATION received from STATE TABLE 410, including the upgrade (UPGRADE) information, commit/flush logic 124 may initiate the Full-Pipeline Selective Recovery. In this example, if the exact convergence instruction is not detected by even the tracker associated with BE EC TRACKERS 450, then the Conventional Flush Recovery may be performed. Although FIG. 4 shows a certain number of components of immunity table logic 400 arranged in a certain manner, there could be more or fewer number of components arranged differently. As an example, although FIG. 4 shows separate STATE TABLE 410, FE EC TRACKERS 430, and BE EC TRACKERS 450, they could be combined to realize similar functionality as described earlier. As another example, although FIG. 4 shows a certain number and a certain arrangement of comparators and multiplexers as part of FE EC TRACKERS 430 and BE EC TRACKERS 450, additional or fewer comparators and multiplexers, arranged differently, may also be used.

Figure 5:
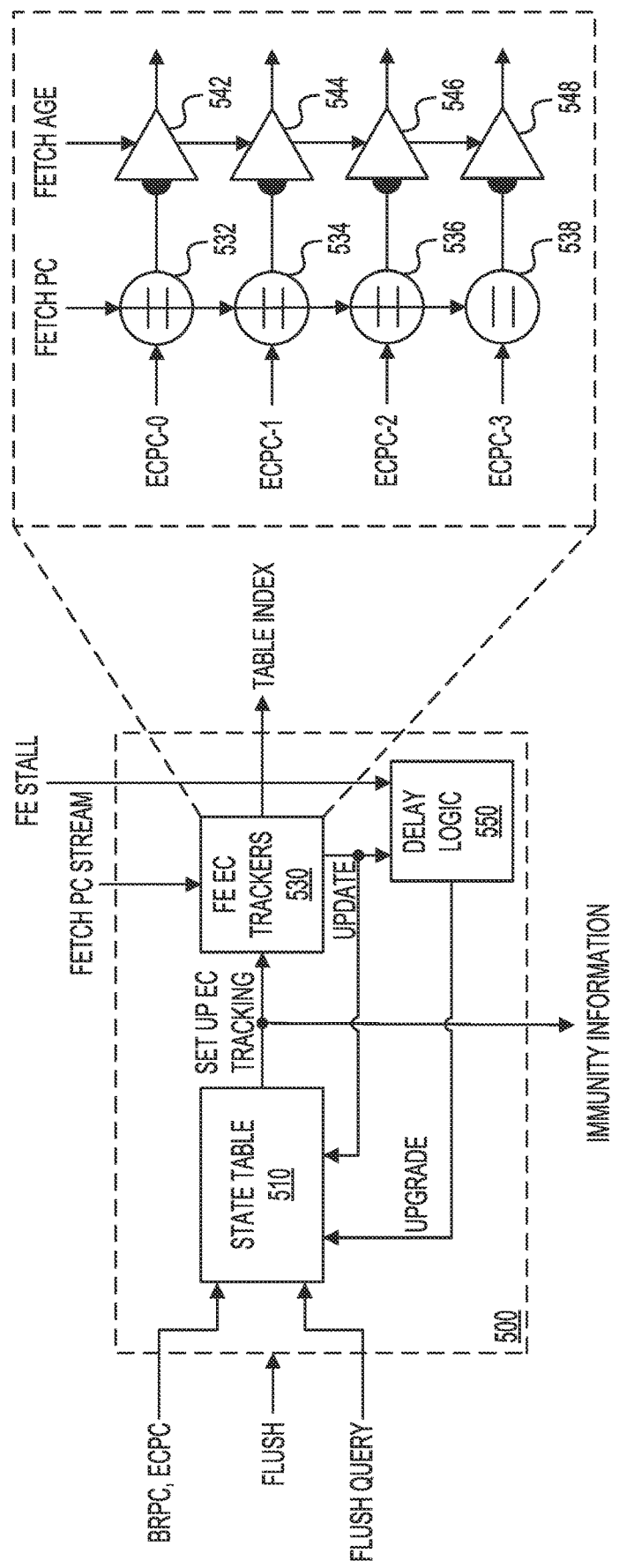
FIG. 5 is a block diagram of immunity table logic associated with processor 100 of FIG. 1 in accordance with another example.

FIG. 5 is a block diagram of immunity table logic 500 associated with processor 100 of FIG. 1 in accordance with another example. Immunity table logic 500 has similar components as described earlier with respect to immunity table logic 200. Immunity table logic 500, however, is modified to allow for the generation of the upgrade (UPGRADE) signal. The type of recovery that is performed may be based on the upgrade (UPGRADE) signal provided to STATE TABLE 510. The upgrade (UPGRADE) signal may act as a proxy for a pipeline location of the exact convergence instruction. In this example, instead of using double the number of trackers as shown as part of immunity table logic 400, time tracking may be used to determine which one of the entries in STATE TABLE 510 should be upgraded such that they are now qualified for the Full-Pipeline Selective Recovery instead of just the Frontend Selective Recovery. A tracker associated with the frontend exact convergence trackers (FE EC TRACKERS 530) may detect the exact convergence of a branch in a similar manner as explained earlier with respect to TRACKERS 250 of FIG. 2. If an exact convergence is detected in the frontend of the pipeline, then as described earlier, the tracker associated with FE EC TRACKERS 530 may update (UPDATE) STATE TABLE 510, including the update to an entry in OPT 350 column.

One implementation of FE EC TRACKERS 530 may include a similar arrangement of comparators and multiplexers as shown in FIG. 2 to detect the matches between the exact convergence program counters (ECPCs) and the program counters (labeled as FETCH PC) being received via the FETCH PC STREAM. Comparator 532 may compare ECPC-0 with the program counters, comparator 534 may compare ECPC-1 with the program counters, comparator 536 may compare ECPC-2 with the program counters, and comparator 538 may compare ECPC-3 with the program counters. Each of the comparators may be coupled to multiplexers (e.g., multiplexers 542, 544, 546, and 548). Depending on the comparison's result, each of the multiplexers may provide outputs 1, 2, 3, and 4. Table 4 below shows example outputs 1, 2, 3, and 4 depending on whether there is a match or not. Thus, assuming the comparison performed by comparator 532 results in a match, then multiplexer 542 may output signal 1 that results in the state table 510 entries updated as: Optimize Entry #0, Update EC AGE. Output signals 2 and 3 indicate no match, and thus no entries of state table 510 may be updated. On the other hand, assuming the comparison performed by comparator 538 results in another match, then multiplexer 548 may output signal 4 that results in the state table 510 entries updated as: Optimize Entry #0, Update EC AGE, Release Entry. Thus, as part of this match, not only the state table entries may be updated but the entry may be released for future use.

TABLE 4

| Output | Description |
|---|---|
| 1 | Match! Optimize Entry #0, Update EC AGE |
| 2 | No Match! |
| 3 | No Match! |
| 4 | Match! Optimize Entry #0, Update EC AGE, Release Entry |

DELAY LOGIC 550 may be used to delay the assertion of the upgrade (UPGRADE) signal to STATE TABLE 510 such that the exact convergence recovery is upgraded to the Full-Pipeline Selective Recovery only if the delay, which may be measured in clock cycles, has met, or passed a certain threshold. The threshold may represent in clock cycles a delay that corresponds to a scenario where the exact convergence no longer will occur in the frontend of the pipeline. In this manner, the exact convergence location (frontend vs. backend) may be estimated. DELAY LOGIC 550 may be implemented using flipflops to measure the delay in dock cycles.

As part of this process, once the exact convergence location is estimated to be in the backend of the pipeline, the corresponding branch entry in STATE TABLE 510 is also upgraded, via the UPGRADE signal output by DELAY LOGIC 550, to indicate that the optimized mispredicted branch now qualifies for the Full-Pipeline Selective Recovery, and not just the Frontend Selective Recovery. In one example, frontend stall (FE STALL) information may also be used by DELAY LOGIC 550 to upgrade an optimized branch from the Frontend Selective Recovery to the Full-Pipeline Selective Recovery. As part of this example, only the cycles where none of the frontend pipeline stages are stalled (e.g., as indicated by the FE STALL information) may be measured by DELAY LOGIC 550. Other types of delay (e.g., any delay based on some other measurements) may also be used to delay the assertion of the upgrade (UPGRADE) signal to STATE TABLE 510 such that the exact convergence recovery is upgraded to the Full-Pipeline Selective Recovery.

With continued reference to FIG. 5, commit/flush logic 124 of FIG. 1 may receive the pipeline flush request. In this example, based on the IMMUNITY INFORMATION received from STATE TABLE 510, including the UPGRADE information, commit/flush logic 124 may initiate the Full-Pipeline Selective Recovery. In this example, if the exact convergence instruction is not detected even by DELAY LOGIC 550, then the Conventional Flush Recovery may be performed. Although FIG. 5 shows a certain number of components of immunity table logic 500 arranged in a certain manner, there could be more or fewer number of components arranged differently. As an example, although FIG. 5 shows a certain number and a certain arrangement of comparators and multiplexers as part of FE EC TRACKERS 530, additional or fewer comparators and multiplexers, arranged differently, may also be used.

Figure 6:
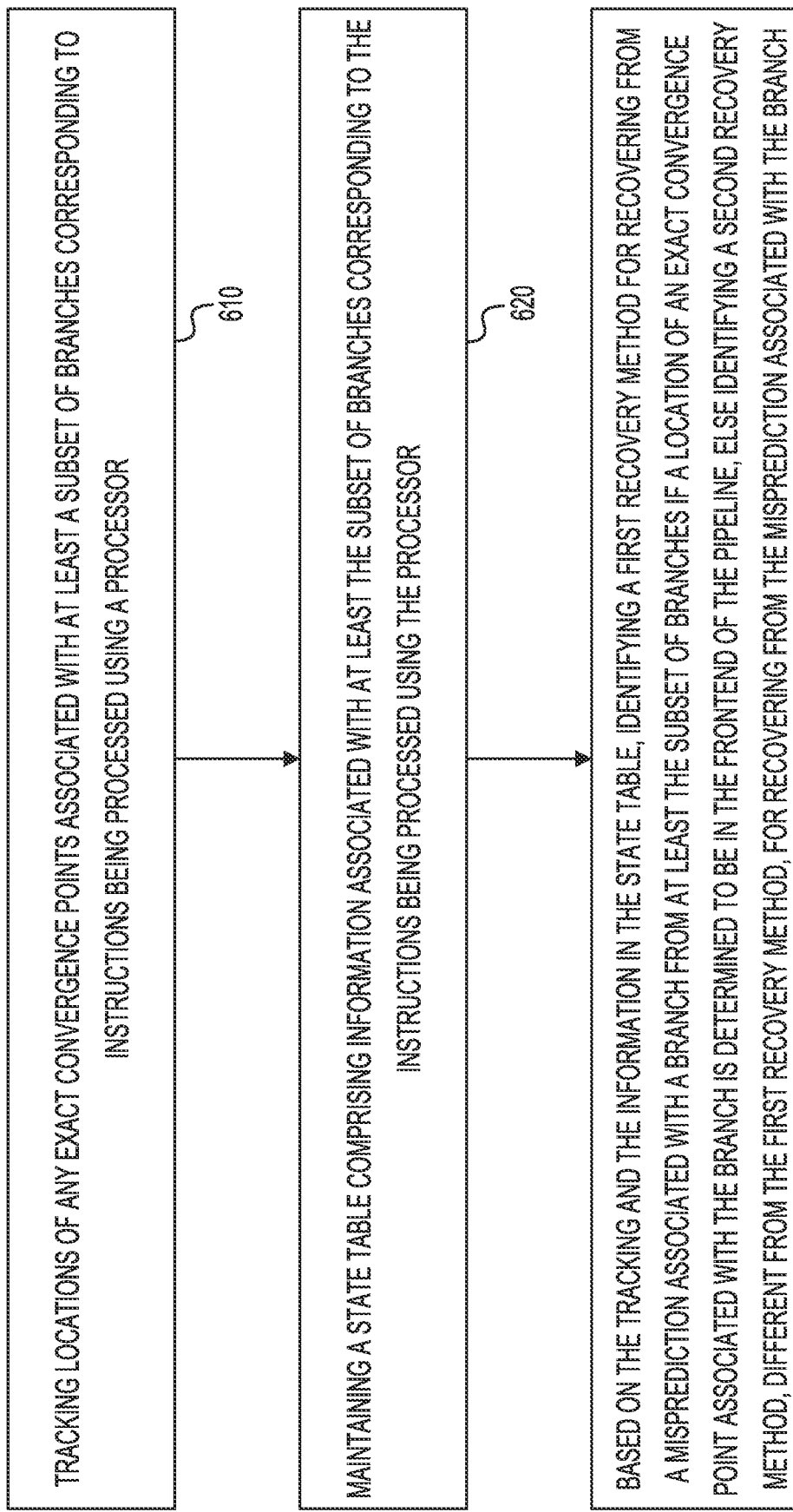
FIG. 6 is a flow chart of a method for operating a processor including a pipeline comprising a first plurality of stages corresponding to a frontend of the pipeline and a second plurality of stages corresponding to a backend of the pipeline in accordance with one example.

FIG. 6 is a flow chart 600 of a method for operating a processor including a pipeline comprising a first plurality of stages corresponding to a frontend of the pipeline and a second plurality of stages corresponding to a backend of the pipeline in accordance with one example. As an example, processor 100 of FIG. 1, including frontend 110 and backend 150 may be operated using the steps associated with this method. Frontend 110 may include at least decoder 114 and micro-ops morphing logic 116. Backend 150 may include at least instruction scheduler 154 and register file 156, Step 610 may include tracking locations of any exact convergence points associated with at least a subset of branches corresponding to instructions being processed using the processor. Any of the trackers described earlier with respect to FIGS. 2-5 may be used to track locations of any exact convergence points.

Step 620 may include maintaining a state table comprising information associated with a subset of branches corresponding to instructions being processed using the processor. Any of the state tables described earlier with respect to FIGS. 2-5 may be used as part of this step. As an example, this step may include maintaining information in state table 300 described with respect to FIG. 3. In addition, immunity table logic 124, which is also referred to as the stage logic, may be used to perform this step.

Step 630 may include, based on the tracking and the information in the state table, identifying a first recovery method for recovering from a misprediction associated with a branch from at least the subset of branches if a location of an exact convergence point associated with the branch is determined to be in the frontend of the pipeline, else identifying a second recovery method, different from the first recovery method, for recovering from the misprediction associated with the branch. Any of the ways described earlier for identifying the first recovery method (e.g., the Frontend Selective Recovery) or the second recovery method (e.g., the Full-Pipeline Selective Recovery) may be used as part of this step. As an example, any of the various implementations of immunity table logic 122 described earlier in coordination with commit/flush logic 124 may be used to perform this step.

Figure 7:
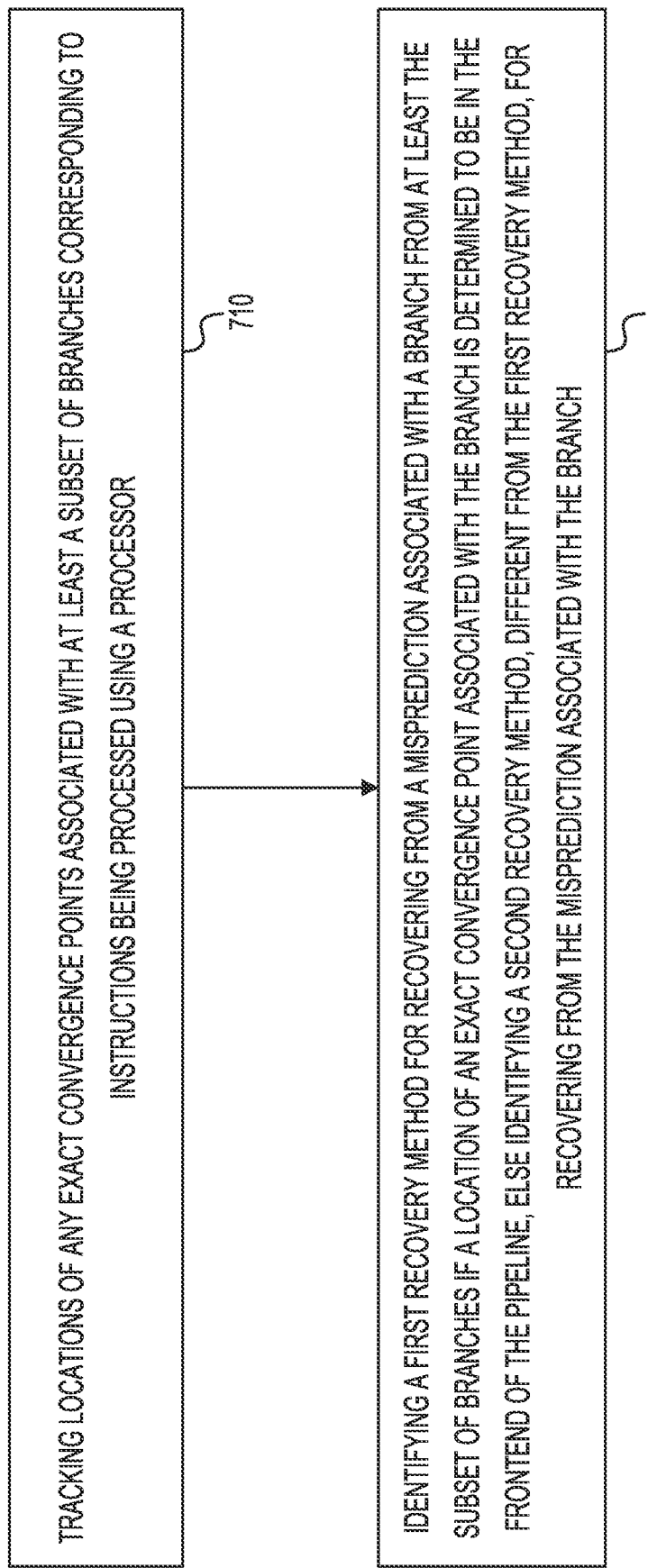
FIG. 7 is a flow chart of another method for operating a processor including a pipeline comprising a first plurality of stages corresponding to a frontend of the pipeline and a second plurality of stages corresponding to a backend of the pipeline.

FIG. 7 is a flow chart 700 of another method for operating a processor including a pipeline comprising a first plurality of stages corresponding to a frontend of the pipeline and a second plurality of stages corresponding to a backend of the pipeline. As an example, processor 100 of FIG. 1, including frontend 110 and backend 150 may be operated using the steps associated with this method. Frontend 110 may include at least decoder 114 and micro-ops morphing logic 116. Backend 150 may include at least instruction scheduler 154 and register file 156. Step 710 may include tracking locations of any exact convergence points associated with at least a subset of branches corresponding to instructions being processed using the processor. Any of the trackers described earlier with respect to FIGS. 2-5 may be used to track locations of any exact convergence points.

Step 720 may include identifying a first recovery method for recovering from a misprediction associated with a branch from at least the subset of branches if a location of an exact convergence point associated with the branch is determined to be in the frontend of the pipeline, else identifying a second recovery method, different from the first recovery method, for recovering from the misprediction associated with the branch. The second recovery method may correspond to the Full-Pipeline Selective Recovery described earlier. Any of the ways described earlier for identifying the first recovery method (e.g., the Frontend Selective Recovery) or the second recovery method (e.g., the Full-Pipeline Selective Recovery) may be used as part of this step. As an example, any of the various implementations of immunity table logic 122 described earlier in coordination with commit/flush logic 124 may be used to perform this step.

In conclusion, in one example, the present disclosure relates to a processor including a pipeline comprising a first plurality of stages corresponding to a frontend of the pipeline and a second plurality of stages corresponding to a backend of the pipeline. The processor may further include a state table for maintaining information related to at least a subset of branches corresponding to instructions being processed by the processor. The processor may further include state logic configured to access the state table. The state logic may further be configured to track locations of any exact convergence points associated with at least a subset of branches corresponding to the instructions being processed by the processor. The state logic may further be configured to identify a first recovery method for recovering from a misprediction associated with a branch from at least the subset of branches if a location of an exact convergence point associated with the branch from at least the subset of branches is determined to be in the frontend of the pipeline, else identify a second recovery method, different from the first recovery method, for recovering from the misprediction associated with the branch.

The state logic may include at least one frontend exact convergence tracker and at least one backend exact convergence tracker. The state logic may include at least one frontend exact convergence tracker and at least one frontend delay logic.

The first recovery method may include in response to a mispredicted branch, flushing only those instructions that are in the backend of the pipeline and are younger than the mispredicted branch. The first recovery method may also include in response to a mispredicted branch, selectively flushing only those instructions that are in the frontend of the pipeline and are older than an exact convergence point associated with the mispredicted branch.

The second recovery method may include in response to a mispredicted branch, at least one of: (1) replaying all instructions included in an incorrect control dependent path as predicate-fail instructions and replaying all control independent data dependent instructions, or (2) executing a selected recovery program. The state logic may further be configured to identify a third recovery method, different from the first recovery method and the second recovery method, and the third recovery method may comprise in response to a mispredicted branch, flushing all instructions younger than the mispredicted branch from both the frontend of the pipeline and the backend of the pipeline.

In another example, the present disclosure relates to a method for operating a processor including a pipeline comprising a first plurality of stages corresponding to a frontend of the pipeline and a second plurality of stages corresponding to a backend of the pipeline. The method may include tracking locations of any exact convergence points associated with at least a subset of branches corresponding to instructions being processed using the processor. The method may further include identifying a first recovery method for recovering from a misprediction associated with a branch from at least the subset of branches if a location of an exact convergence point associated with the branch is determined to be in the frontend of the pipeline, else identifying a second recovery method, different from the first recovery method, for recovering from the misprediction associated with the branch.

The tracking locations of any convergence points associated with at least the subset of branches corresponding to the instructions being processed using the pipeline may include using: (1) a state table for maintaining information related to at least the subset of branches corresponding to the instructions being processed by the processor, (2) at least one frontend exact convergence tracker, and (3) at least one backend exact convergence tracker. The tracking locations of any convergence points associated with at least the subset of branches corresponding to the instructions being processed using the pipeline may further comprise using: (1) a state table for maintaining information related to at least the subset of branches corresponding to the instructions being processed by the processor, (2) at least one frontend exact convergence tracker, and (3) at least one frontend delay logic.

The first recovery method may include in response to a mispredicted branch, flushing only those instructions that are in the backend of the pipeline and are younger than the mispredicted branch. The first recovery method may also include in response to a mispredicted branch, selectively flushing only those instructions that are in the frontend of the pipeline and are older than an exact convergence point associated with the mispredicted branch.

The second recovery method may include in response to a mispredicted branch, at least one of: (1) replaying all instructions included in an incorrect control dependent path as predicate-fail instructions and replaying all control independent data dependent instructions, or (2) executing a selected recovery program. The method may further include identifying a third recovery method, different from the first recovery method and the second recovery method, and the third recovery method may comprise in response to a mispredicted branch, flushing all instructions younger than the mispredicted branch from both the frontend of the pipeline and the backend of the pipeline.

In yet another example, the present disclosure relates to a method for operating a processor including a pipeline comprising a first plurality of stages corresponding to a frontend of the pipeline and a second plurality of stages corresponding to a backend of the pipeline. The method may include tracking locations of any exact convergence points associated with at least a subset of branches corresponding to instructions being processed using the processor. The method may further include maintaining a state table comprising information associated with at least the subset of branches corresponding to the instructions being processed using the processor. The method may further include based on the tracking and the information in the state table, identifying a first recovery method for recovering from a misprediction associated with a branch from at least the subset of branches if a location of an exact convergence point associated with the branch is determined to be in the frontend of the pipeline, else identifying a second recovery method, different from the first recovery method, for recovering from the misprediction associated with the branch.

The tracking locations of any convergence points associated with at least the subset of branches corresponding to the instructions being processed using the pipeline may comprise using: (1) at least one frontend exact convergence tracker configured to detect any exact convergence points within the frontend of the pipeline and (2) at least one backend exact convergence tracker configured to detect any exact convergence points within the backend of the pipeline. The tracking locations of any convergence points associated with at least the subset of branches corresponding to the instructions being processed using the pipeline may comprise using: (1) at least one frontend exact convergence tracker configured to detect any exact convergence points within the frontend of the pipeline and (2) at least one frontend delay logic configured to delay an assertion of a signal identifying the second recovery method for recovering from a misprediction associated with a branch.

The first recovery method may include in response to a mispredicted branch, flushing only those instructions that are in the backend of the pipeline and are younger than the mispredicted branch. The second recovery method may include in response to a mispredicted branch, at least one of: (1) replaying all instructions included in an incorrect control dependent path as predicate-fail instructions and replaying all control independent data dependent instructions, or (2) executing a selected recovery program. The method may further include identifying a third recovery method, different from the first recovery method and the second recovery method, and the third recovery method may comprise in response to a mispredicted branch, flushing all instructions younger than the mispredicted branch from both the frontend of the pipeline and the backend of the pipeline.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs) Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, or the component B may be a sub-component of the component A.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A processor comprising:
    a pipeline comprising a first plurality of stages corresponding to a frontend of the pipeline and a second plurality of stages corresponding to a backend of the pipeline; and
    digital logic to access a state table for maintaining information related to at least a subset of branches corresponding to instructions being processed by the processor, wherein the digital logic is configured to:
        track locations of any exact convergence points associated with the at least the subset of branches corresponding to the instructions being processed by the processor, and initiate a first recovery method for recovering from a misprediction associated with a branch from the at least the subset of branches if a location of an exact convergence point associated with the branch is determined to be in the frontend of the pipeline, or else initiate a second recovery method, different from the first recovery method, for recovering from the misprediction associated with the branch, wherein the location of the exact convergence point associated with the branch is determined based on an entry for the branch in the state table.

2. The processor of claim 1, wherein the digital logic further comprises a branch qualifier.

3. The processor of claim 1, wherein the digital logic comprises a plurality of frontend trackers and a plurality of backend trackers, wherein each of the plurality of frontend trackers comprises logic to compare any program counters received as part of a stream of fetched instruction addresses with an exact convergence program counter for the branch, and wherein each of the plurality of backend trackers comprises logic to compare any program counters received as part of an allocated stream of instruction addresses with the exact convergence program counter for the branch.

4. The processor of claim 1, wherein the digital logic further comprises delay logic configured to selectively delay a provision of an upgrade signal for upgrading the entry for the branch in the state table.

5. The processor of claim 1, wherein the first recovery method comprises in response to a mispredicted branch, flushing only those instructions that are in the backend of the pipeline and are younger than the mispredicted branch.

6. The processor of claim 1, wherein the first recovery method comprises in response to a mispredicted branch, selectively flushing only those instructions that are in the frontend of the pipeline and are older than an exact convergence point associated with the mispredicted branch.

7. The processor of claim 1, wherein the second recovery method comprises in response to a mispredicted branch, at least one of: (1) replaying all instructions included in an incorrect control dependent path as predicate-fail instructions and replaying all control independent data dependent instructions, or (2) executing a selected recovery program.

8. The processor of claim 1, wherein the digital logic is further configured to initiate a third recovery method, different from the first recovery method and the second recovery method, and wherein the third recovery method comprises in response to a mispredicted branch, flushing all instructions younger than the mispredicted branch from both the frontend of the pipeline and the backend of the pipeline.

9. A method for operating a processor including a pipeline comprising a first plurality of stages corresponding to a frontend of the pipeline and a second plurality of stages corresponding to a backend of the pipeline, the method comprising:
tracking locations of any exact convergence points associated with at least a subset of branches corresponding to instructions being processed using the processor;
maintaining a state table comprising information associated with the at least the subset of branches corresponding to the instructions being processed using the processor; and
initiating a first recovery method for recovering from a misprediction associated with a branch from the at least the subset of branches if a location of an exact convergence point associated with the branch is determined to be in the frontend of the pipeline, or else initiating a second recovery method, different from the first recovery method, for recovering from the misprediction associated with the branch, wherein the location of the exact convergence point associated with the branch is determined based on an entry for the branch in the state table.

10. The method of claim 9, further comprising prior to tracking locations of any exact convergence points associated with any of the at least the subset of branches, determining whether any of the at least the subset of branches is eligible for exact convergence tracking.

11. The method of claim 9, wherein the processor comprises a plurality of frontend trackers and a plurality of backend trackers, wherein each of the plurality of frontend trackers comprises logic to compare any program counters received as part of a stream of fetched instruction addresses with an exact convergence program counter for the branch, and wherein each of the plurality of backend trackers comprises logic to compare any program counters received as part of an allocated stream of instruction addresses with the exact convergence program counter for the branch.

12. The method of claim 9, wherein the first recovery method comprises in response to a mispredicted branch, flushing only those instructions that are in the backend of the pipeline and are younger than the mispredicted branch.

13. The method of claim 8, wherein the first recovery method comprises in response to a mispredicted branch, selectively flushing only those instructions that are in the frontend of the pipeline and are older than an exact convergence point associated with the mispredicted branch.

14. The method of claim 9, wherein the second recovery method comprises in response to a mispredicted branch, at least one of: (1) replaying all instructions included in an incorrect control dependent path as predicate-fail instructions and replaying all control independent data dependent instructions, or (2) executing a selected recovery program.

15. The method of claim 9, further comprising initiating a third recovery method, different from both the first recovery method and the second recovery method, and wherein the third recovery method comprises in response to a mispredicted branch, flushing all instructions younger than the mispredicted branch from both the frontend of the pipeline and the backend of the pipeline.

16. A method for operating a processor including a pipeline comprising a first plurality of stages corresponding to a frontend of the pipeline and a second plurality of stages corresponding to a backend of the pipeline, the method comprising:
using a plurality of frontend trackers and a plurality of backend trackers, tracking locations of any exact convergence points associated with at least a subset of branches corresponding to instructions being processed using the processor;
maintaining a state table comprising information associated with the at least the subset of branches corresponding to the instructions being processed using the processor; and
initiating a first recovery method for recovering from a misprediction associated with a branch from the at least the subset of branches if a location of an exact convergence point associated with the branch is determined to be in the frontend of the pipeline, or else initiating a second recovery method, different from the first recovery method, for recovering from the misprediction associated with the branch, wherein at least one of the plurality of backend trackers associated with the branch is configured to provide an upgrade signal for upgrading an entry for the branch in the state table indicative of the location of the exact convergence point associated with the branch.

17. The method of claim 16, further comprising prior to tracking locations of any exact convergence points associated with any of the at least the subset of branches, determining whether any of the at least the subset of branches is eligible for exact convergence tracking.

18. The method of claim 16, wherein each of the plurality of frontend trackers comprises logic to compare any program counters received as part of a stream of fetched instruction addresses with an exact convergence program counter for the branch, and wherein each of the plurality of backend trackers comprises logic to compare any program counters received as part of an allocated stream of instruction addresses with the exact convergence program counter for the branch.

19. The method of claim 16, wherein the first recovery method comprises in response to a mispredicted branch, flushing only those instructions that are in the backend of the pipeline and are younger than the mispredicted branch.

20. The method of claim 18, wherein the first recovery method comprises in response to a mispredicted branch, selectively flushing only those instructions that are in the frontend of the pipeline and are older than an exact convergence point associated with the mispredicted branch, and wherein the second recovery method comprises in response to the mispredicted branch, at least one of: (1) replaying all instructions included in an incorrect control dependent path as predicate-fail instructions and replaying all control independent data dependent instructions, or (2) executing a selected recovery program.

* * * * *